United States Patent
Armstrong

(10) Patent No.: US 6,424,336 B1
(45) Date of Patent: Jul. 23, 2002

(54) VARIABLE RATE ON-OFF MESSAGING SYSTEM

(76) Inventor: Brad A. Armstrong, P.O. Box 2048, Carson City, NV (US) 89702

( * ) Notice: Subject to any disclaimer, the term of this patent is extended or adjusted under 35 U.S.C. 154(b) by 0 days.

(21) Appl. No.: 09/566,678

(22) Filed: May 8, 2000

Related U.S. Application Data

(60) Provisional application No. 60/133,319, filed on May 10, 1999.

(51) Int. Cl.[7] ................................................. G09G 5/08
(52) U.S. Cl. ......................................... 345/159; 463/37
(58) Field of Search ................................ 345/156, 157, 345/161, 163, 159, 167, 173; 463/36, 37, 38; 74/471

(56) References Cited

U.S. PATENT DOCUMENTS

| | | | | |
|---|---|---|---|---|
| 5,508,719 A | * | 4/1996 | Gervais | 345/157 |
| 5,689,285 A | * | 11/1997 | Asher | 345/161 |
| 5,812,114 A | * | 9/1998 | Loop | 345/157 |
| 5,923,317 A | * | 7/1999 | Sayler et al. | 345/156 |
| 5,973,668 A | * | 10/1999 | Watanabe | 345/157 |

* cited by examiner

*Primary Examiner*—Chang Nguyen
(74) *Attorney, Agent, or Firm*—Richard T. Holzmann

(57) ABSTRACT

A method of controlling a two-hand held controller with an analog pressure sensor(s) for controlling video game machines and imagery thereof, and other electronically generated imagery. The method for communicating an on/off simple-switch output signal to hardware or to software, which is expecting to receive such a simple binary signal as is typically generated by some type of on/off switch or switching device. In this invention the on/off signal is generated by circuitry which has as its input an analog sensor having pressure-sensitive variable-conductance material. Such an analog input sensor may be operated by depressing a button/trigger/4-way rocker or the like. The on/off signal, or information packet containing such a signal, is communicated at a variable rate in time. The communication rate being determined by the level of pressure applied to the input device.

2 Claims, 1 Drawing Sheet

VARIABLE RATE ON-OFF MESSAGING SYSTEM

This is a nonprovisional application claiming the benefits of Provisional Application No. 60/133,319 filed on May 10, 1999 by Brad A. Armstrong the sole inventor common to both applications. This provisional application contains a specification consisting of 120 pages, 119 of which are two computer programs; one such program Computer Program 2 is incorporated by reference herein along with the balance of that provisional application. Furthermore, this new nonprovisional application incorporates by reference the entire copending application Ser. No. 08/942,450 filed on Oct. 1, 1997 by the sole inventor Brad A. Armstrong, entitled "Game Controller with Analog Pressure Sensor", which has already been allowed and the Issue Fee of which was paid on Apr. 9, 2000.

FIELD OF THE INVENTION

The present invention relates to a method of control of controllers of the type used and held by two hands simultaneously to control visual imagery shown on a visual display. More specifically, the present invention pertains to a method of controlling a two-hand held controller with an analog pressure sensor(s) for controlling video game machines and imagery thereof, and other electronically generated imagery.

BACKGROUND OF THE INVENTION AND DESCRIPTION OF RELATED PRIOR ART

The background of this method application is identical with that in the above-cited copending product application Ser. No. 08/942,450 filed on Oct. 1, 1997 by the sole inventor Brad A. Armstrong and incorporated herein. Computer Program 2 of the above-cited provisional application is also incorporated by reference herein. Thus, there is no need to repeat the detail here.

It is the principal object of the present invention to provide the public with a method for implementing control of the game controller having an analog pressure sensor(s) of the above-cited copending application.

For completeness, it should be noted that it has recently come to the attention of the instant inventor that there exists a steering wheel mechanism that runs a rotary potentiometer which outputs a variable frequency on/off signal. However, no additional information on the source of this product is available. Of course, such a steering wheel device is very limited in performance since it can only output in two axes, i.e., turning to left and turning to right. The instant invention has no such limitation and thus has much broader application potential.

SUMMARY OF THE INVENTION

A method for communicating an on/off simple-switch output signal to hardware or to software, which is expecting to receive such a simple binary signal as is typically generated by some type of on/off switch or switching device. In this invention the on/off signal is generated by circuitry which has as its input an analog sensor having pressure-sensitive variable-conductance material. Such an analog input sensor may be operated by depressing a button or trigger or 4-way rocker or the like. The on/off signal, or information packet containing such a signal, is communicated at a variable rate in time. The communication rate being determined by the level of pressure applied to the input device.

As an example, and as clear evidence of reduction to practice, is the included listing named Computer Program 2 found in Provisional Application No. 60/133,319 filed on May 10, 1999 by the instant inventor, which may be embodied in a Cypress USB chip located within an analog game controller connected to a computer by a USB connection. This analog game controller has in place of at least one of its normal on/off depressible switches (driven by buttons, triggers, etc.) an analog pressure-sensitive variable-conductance sensor so that when a depressible surface area is depressed by a human finger then the analog sensor changes its electrical resistance properties in relation to how hard the button/trigger/4-way rocker or the like is being depressed.

Computer Program 2 reads the level of depressive pressure exerted, by the user's finger, by the time necessary to charge a capacitor through the variably resistive analog sensor. Computer Program 2 then outputs information packets containing the information of a simple on/off switch, but the packets are communicated infrequently when the depressible surface area is depressed lightly, and the packets are communicated more frequently when the depressible surface area is depressed more forcefully. A range is established of light depressive pressure causing output of few information packets in time and heavier depressive pressure causing more frequent output of information packets in time. Thus, information packets (indicating that a simple on/off switch has been singularly activated) are output from the game controller at a rate dependent on the pressure applied to an analog pressure sensor.

A computer program for such a system includes the steps of: reading the level of depressive pressure applied to said analog sensor by the user's finger; establishing a value representing said depressive pressure; and outputting information packets containing the information of at least a simple on/off switch, representing depression applied by said finger, at a frequency of said outputting of said information packet according to said value, communicating infrequently when said depressible surface area is depressed lightly, and communicating more frequently when said depressible surface area is depressed more forcefully.

In accordance with either of the above, a microcontroller further comprises the steps of: checking the value of a switch for identifying a button as analog or digital; sending a single on/off information packet when the switch is set to digital; and sending a variable frequency on/off information packet when the switch is set to analog.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments which are presently preferred. It should be understood however, that the invention is not limited to the precise arrangements and instrumentalities shown. In the drawings.

DESCRIPTION OF THE PREFERRED EMBODIMENT

The best mode envisioned by the inventor incorporates Computer Program 2 of the provisional application into the hardware disclosed, claimed and allowed in the nonprovisional application whose Issue Fee has already been paid. Thus, all that is required is to read the sensor, obtain a value in timer 1, linearize that value, and load that linearized value into timer 2.

Figure 1:
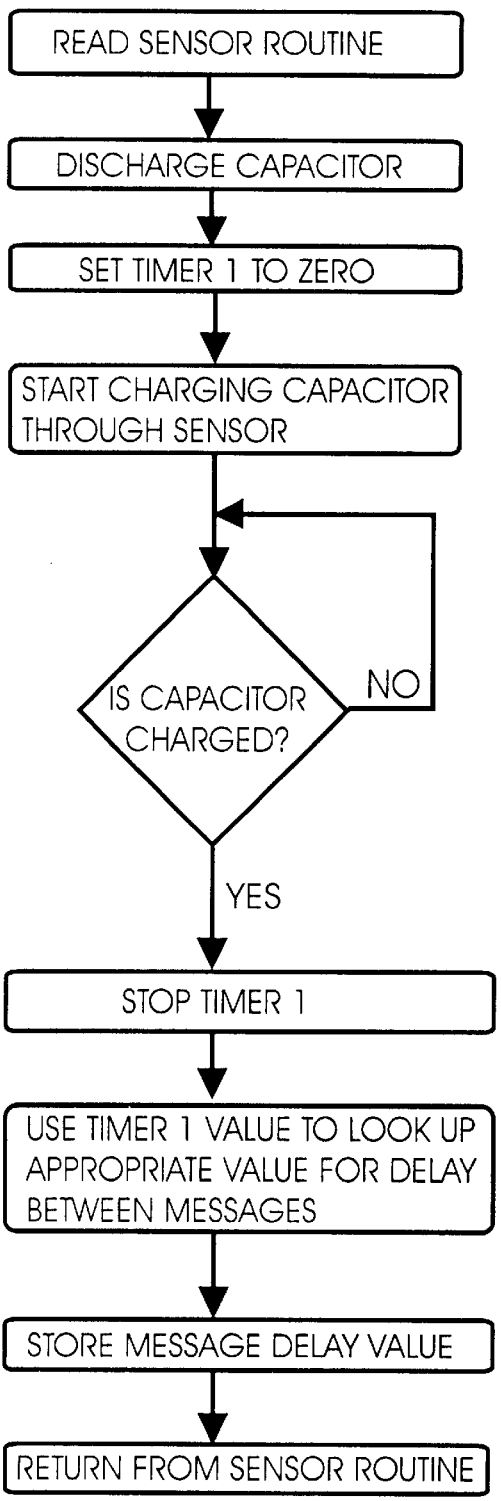
FIG. 1 is a flow chart of the method of the read sensor routine.

The preferred embodiment of the present method invention can best be illustrated by reference to the flow charts in FIG. 1 and FIG. 2. FIG. 1 embodies the Read Sensor Routine wherein the microcontroller or circuitry in Step 1 discharges the capacitor connected to the variable resistance pressure sensor. It does this for a period of time that ensures that the capacitor will be fully discharged. In Step 2 the microcontroller resets timer 1 to zero and lets it begin counting. Immediately following this, in Step 3, the microcontroller changes the I/O pin connected to the sensor/capacitor combination to an input allowing the capacitor to start charging up through the pressure sensor. The harder the sensor is being pressed, the lower its resistance, and therefore the faster the capacitor will charge.

In Step 4 the microcontroller continually checks to see if the capacitor has charged up sufficiently to present a logic high to the input pin. After the capacitor has charged, in Step 5 the controller stops the time in timer 1. In Step 6 the controller uses timer 1 value to look up appropriate value in a lookup table as an index to linearize the values for delay between messages.

In Step 7 the controller stores the linearized sensor value (the message delay value) to use as a timer value in the timer interrupt.

Figure 2:
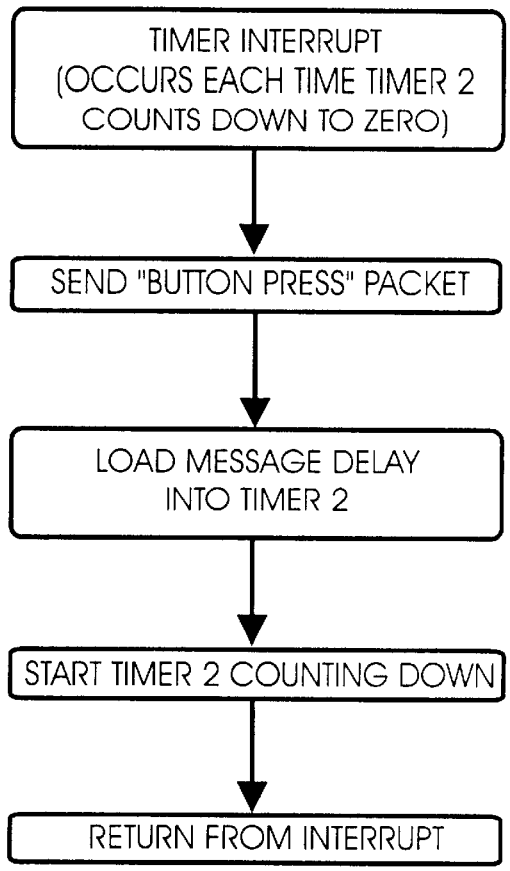
FIG. 2 is a flow chart of the timer interrupt.

In FIG. 2, in Step 1 of the timer interrupt, the controller sends a packet indicating that a button was pressed. This occurs each time timer 2 counts down to zero. In Step 2 the controller loads the linearized sensor value as a timer value into timer 2. This allows the controller to vary the amount of time between "button pressed" packets depending upon the pressure on the sensor. In Step 3 the controller starts timer 2 counting down, so that the controller will return to the interrupt when the time is done.

A computer program for such a system includes the steps of: reading the level of depressive pressure applied to said analog sensor by the user's finger; establishing a value representing said depressive pressure; and outputting information packets containing the information of at least a simple on/off switch, representing depression applied by said finger, at a frequency of said outputting of said information packet according to said value, communicating infrequently when said depressible surface area is depressed lightly, and communicating more frequently when said depressible surface area is depressed more forcefully.

As an alternative, the controller can check the value of a switch to determine if the button should be analog or digital. If the switch is set to digital and the linearized value is below a set threshold, the controller sends a single "button pressed" packet. This type of implementation allows a button to be switched between analog and digital depending upon the application.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. A method for communicating an on/off simple-switch output signal to computer hardware or software wherein said signal is generated by circuitry which has as its input an analog sensor having pressure-sensitive variable-conductance material, said sensor activated by depression of a depressible surface area, said circuitry communicating at a variable rate in time as a function of the level of pressure applied to said sensor, wherein a microcontroller includes the steps of:

(a) discharging a capacitor connected to the variable-resistance pressure sensor ensuring that the capacitor is fully discharged;

(b) resetting first timer 1 to zero to allow it to begin counting;

(c) changing an I/O pin connected to the sensor/capacitor combination to an input allowing the capacitor to start charging through said sensor as a function of pressure applied to said sensor;

(d) checking the capacitor continuously until charged sufficiently to present a logic high to said input pin;

(e) stopping timer 1 after the capacitor is charged;

(f) linearizing timer 1 values by reference to a lookup table;

(g) storing said linearized sensor value for message delay value for use as a second timer 2 value in a timer interrupt;

(h) interrupting timer 1 when timer 2 counts down to zero;

(i) sending a button press information packet each time timer 2 counts to zero;

(j) loading said linearized sensor value into timer 2 allowing the microcontroller to vary the time between the button depressed packets depending upon the pressure on the sensor;

(k) starting timer 2 countdown; and (l) returning to the read sensor routine when the countdown of timer 2 is done.

2. The method according to claim 1 wherein the microcontroller further comprises the steps of:

(a) checking the value of a switch for identifying a button as analog or digital;

(b) sending a single on/off information packet when the switch is set to digital; and (c) sending a variable frequency on/off information packet when the switch is set to analog.

* * * * *